(12) United States Patent
Olson

(10) Patent No.: US 10,982,402 B1
(45) Date of Patent: *Apr. 20, 2021

(54) SCISSORS GATE VALVE AND SYSTEM WATER MANAGEMENT SYSTEM

(71) Applicant: Keith D. Olson, Deer Park, IL (US)

(72) Inventor: Keith D. Olson, Deer Park, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/030,964

(22) Filed: Sep. 24, 2020

Related U.S. Application Data

(63) Continuation of application No. 16/793,330, filed on Feb. 18, 2020, now Pat. No. 10,865,536.

(60) Provisional application No. 62/807,959, filed on Feb. 20, 2019.

(51) Int. Cl.
| | | |
|---|---|---|
| *E02B 7/28* | (2006.01) | |
| *F16K 3/02* | (2006.01) | |
| *E02B 8/04* | (2006.01) | |
| *E02B 9/02* | (2006.01) | |

(52) U.S. Cl.
CPC .................. *E02B 7/28* (2013.01); *E02B 8/04* (2013.01); *E02B 9/027* (2013.01); *F16K 3/0209* (2013.01); *F16K 3/0218* (2013.01)

(58) Field of Classification Search
CPC ... E02B 7/28; E02B 9/027; E02B 3/26; E02B 3/10; E02B 8/04; F16K 3/0209; F16K 3/0218; F16K 3/0281
USPC .................. 251/326, 329; 403/103, 104, 107
See application file for complete search history.

(56) References Cited

U.S. PATENT DOCUMENTS

| | | |
|---|---|---|
| 283,264 A | 8/1883 | Mallard |
| 648,312 A | 4/1900 | Taylor |
| 973,606 A | 10/1910 | Worley |
| 1,192,141 A | 7/1916 | White |
| 1,444,576 A | 2/1923 | Williamson |
| 1,492,482 A | 4/1924 | Preston |
| 1,578,695 A | 3/1926 | Westrip |
| 2,257,626 A | 9/1941 | Thomson |
| 2,550,984 A | 5/1951 | Ferguson |
| 2,835,469 A | 5/1958 | Rothenberger |
| 2,889,684 A | 6/1959 | Abrahams |
| 3,170,670 A | 2/1965 | Fulton |
| 3,371,493 A | 3/1968 | Woolley |
| 4,169,577 A | 10/1979 | Damratroski et al. |
| 4,226,553 A | 10/1980 | Whipps et al. |
| 4,265,564 A | 5/1981 | Watelet |

(Continued)

FOREIGN PATENT DOCUMENTS

| | | |
|---|---|---|
| CN | 203743471 U | 7/2014 |
| CN | 208105201 U | 11/2018 |

(Continued)

OTHER PUBLICATIONS

Weir, Highest Performance Zero Leakage, Knife Gate Valves, Delta Industrial Valves, Inc., 28 pages.

*Primary Examiner* — David Colon-Morales
(74) *Attorney, Agent, or Firm* — Brinks Gilson & Lione

(57) ABSTRACT

A gate valve for use in controlling the level of a dam has a first plate with an aperture on an upstream face of the dam and a movable plate on the upstream side of the fixed plate, with apertures sixed and dimensioned to operate as a scissors when the movable plate is urged in a linear motion parallel to fixed plate. One or more edges of the apertures in the plates are provided with a sharp edge or a serrate edge oriented to sever obstructing object present in the apertures when the valve is transitioning from an open position to a closed position.

8 Claims, 5 Drawing Sheets

(56) References Cited

U.S. PATENT DOCUMENTS

| | | |
|---|---|---|
| 4,354,663 A | 10/1982 | Vanderburg et al. |
| 4,356,838 A | 11/1982 | Morello |
| 4,524,950 A | 6/1985 | Vitas et al. |
| 4,726,709 A | 2/1988 | Labelle |
| 4,798,365 A | 1/1989 | Mayhew |
| 4,848,962 A | 7/1989 | Whipps |
| 5,141,361 A | 8/1992 | Fontaine |
| 5,271,602 A | 12/1993 | Funaba |
| 5,370,362 A | 12/1994 | Kent et al. |
| 5,449,146 A | 9/1995 | Weagraff |
| 5,501,424 A | 3/1996 | Williams et al. |
| 5,803,431 A | 9/1998 | Hoang et al. |
| 6,176,493 B1 | 1/2001 | Whipps |
| 6,311,949 B1 | 11/2001 | Iida et al. |
| 6,604,889 B1 | 8/2003 | Wood et al. |
| 6,681,790 B2 | 1/2004 | Knobbe et al. |
| 7,451,717 B1 | 11/2008 | Levine et al. |
| 8,070,131 B2 | 12/2011 | Liew |
| 8,425,150 B1 | 4/2013 | Happel |
| 8,544,538 B2 | 10/2013 | Weir et al. |
| 8,770,545 B2 | 7/2014 | Whipps et al. |
| 9,537,183 B2 | 1/2017 | Appelboom et al. |
| 9,611,939 B2 | 4/2017 | Palmer |
| 10,039,242 B1 | 8/2018 | Goldwasser |
| 2002/0066484 A1 | 6/2002 | Stringam et al. |
| 2007/0205385 A1 | 9/2007 | Krause et al. |
| 2009/0095932 A1 | 4/2009 | Leblanc |
| 2009/0236554 A1 | 9/2009 | Gifford et al. |
| 2011/0220828 A1 | 9/2011 | Kennedy |
| 2012/0261603 A1 | 10/2012 | Kahn et al. |
| 2018/0347708 A1 | 12/2018 | Binder |

FOREIGN PATENT DOCUMENTS

| | | |
|---|---|---|
| DE | 43 24 555 A1 | 1/1995 |
| EP | 1582631 A1 | 10/2005 |
| GB | 362670 | 12/1931 |
| GB | 682057 | 11/1952 |
| WO | WO 2006/047847 A1 | 5/2006 |

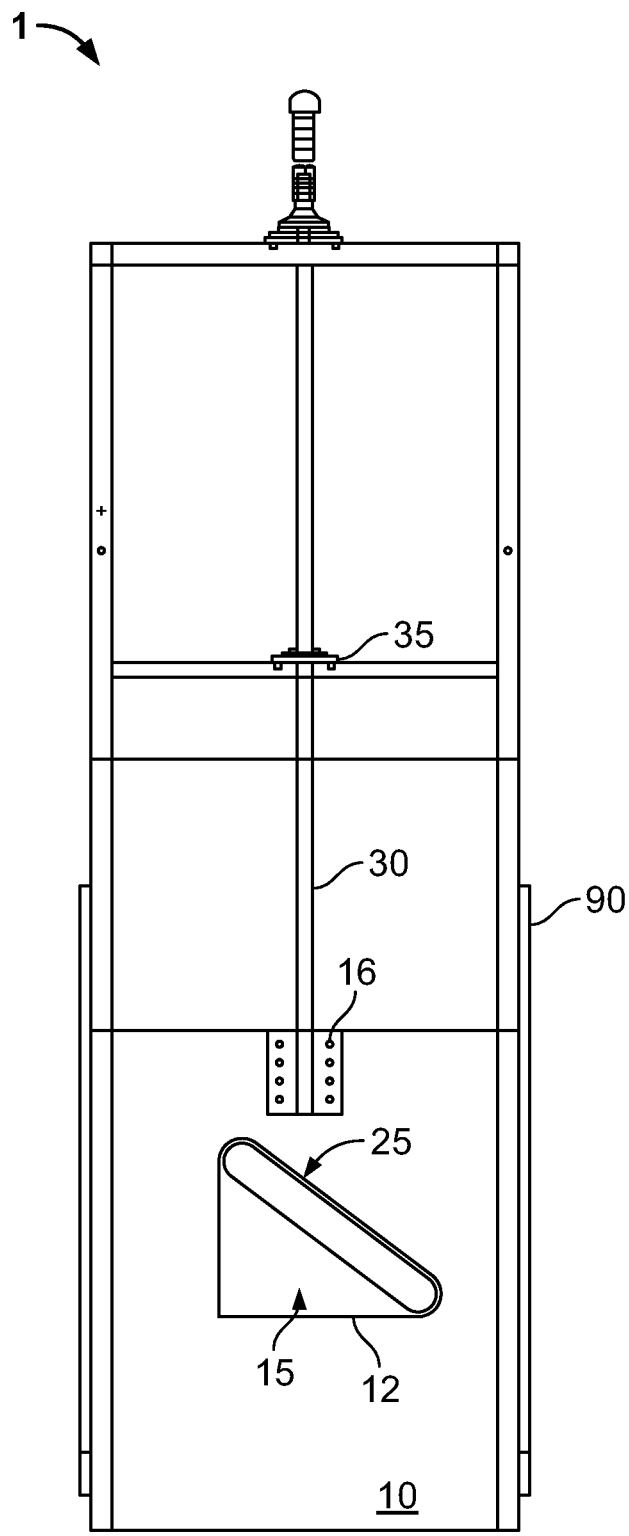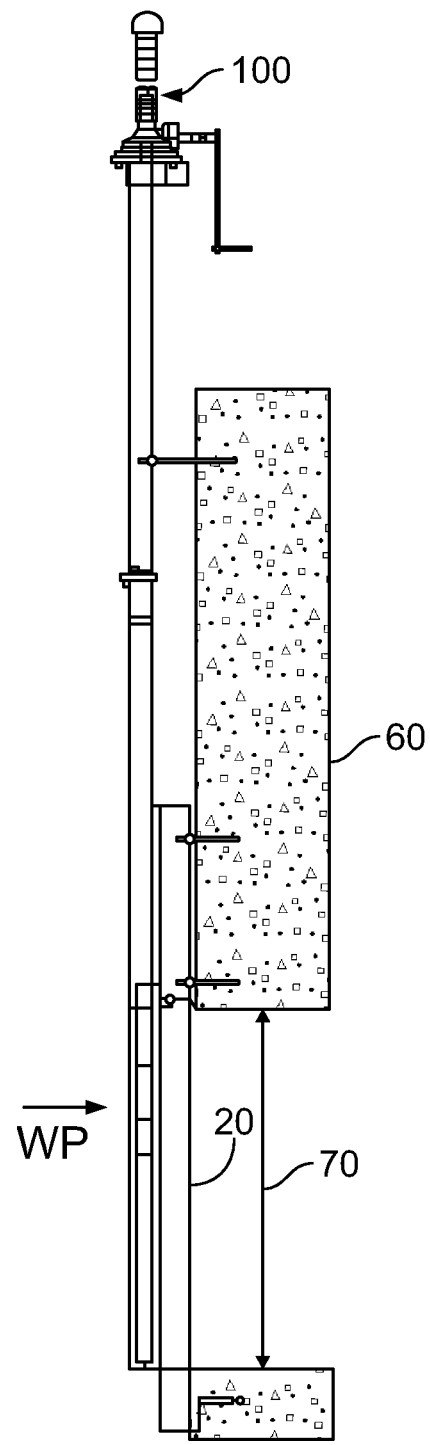
FIG. 1A  FIG. 1B

US 10,982,402 B1

SCISSORS GATE VALVE AND SYSTEM WATER MANAGEMENT SYSTEM

This application is a continuation of U.S. Ser. No. 16/793,330 which claims the benefit of priority to U.S. provisional application No. 62/807,959, which was filed on Feb. 20, 2019, which are incorporated herein.

TECHNICAL FIELD

This application may relate to a scissor-type gate valve for use in water flow control.

BACKGROUND

Dams, impoundments and other structures may be used to manage water resources for irrigation, flood control and other purposes. Broadly, such water management structures are filled by rivers, streams, and springs having rain or melting snow as the source of water. The level of the water often varies due to an imbalance between supply and depletion, where the depletion may be due to natural evaporation or the discharge of water over spillways, through apertures or valves in the dam, or by use for hydroelectric power. In addition to these mechanisms, one may desire to manage the level of water in the "reservoir", as we shall call any structure that can contain a quantity of water, to account for seasonal factors in the balance of supply and depletion or to prepare for, or accommodate an anticipated substantial influx of water due to a major storm. Herein, any man-made structure that contributes to the ability of the reservoir to retain water therein will be described as a "dam".

The controlled release of water from a reservoir may be desirable so as to manage the volume of water flowing in the channels below the dam, or to prevent the level of water from reaching a height such that the top of the dam is overtopped and water is discharged in an uncontrollable volume. Where a reservoir is also used for recreational use, the water level may be managed at different levels depending on the season.

Release of water may be controlled by operation of a valve system in a dam and such valves may be manually or automatically operated, depending on the specific installation. As part of a water management system a plurality of valves at various locations within a watershed may be remotely controlled and, in combination with water level sensors in the reservoirs and discharge channels, comprise a water distribution system, such as an irrigation system or a flood control system, or the like.

The controlled valves may be in remote or inaccessible locations lack immediate access by humans and may be intended to operate unattended for extended periods of time. The valve may be at a depth of water in the reservoir that is substantially below the water surface level. The actual water surface height above the valve intake port is termed the "head", where the maximum design head is usually associated with the reservoir in a filled state, and the minimum design head is associated with the reservoir in a depleted state. This minimum design head is a function of the specific design and purpose of the reservoir and may be substantially smaller than the maximum design head.

Debris entering the reservoir from the shore or feed streams may interfere with the operation of the valve. Such debris may be broken limbs, damaged structures or the like. When the head is high much of the debris will be above the valve intake port, but at low heads, the debris may become jammed in the valve and prevent its proper operation, either manually or automatically. Various structures may be incorporated in the dam design so as to mitigate the potential for blockage such as a crib or grid, but a piece of wood jammed in the valve may defeat the system.

A common valve type use in these applications is a gate valve, which operates by linearly sliding a solid blocking member, which may be a metal plate, across an opening in the water channel. The sliding member may close the aperture and seat against the valve body by engaging with a flexible member so as to provide a water tight seal. The blocking member may have a tapered shape along the edge that is exposed when the blocking member is being advanced in to the blocking position and such valves are termed knife valves. This type of valve is more often used to control bulk material such as grain. As such, the knife edge does not encounter any obstruction as it is advanced to close the valve and in some cases the aperture is rectangular rather than circular. But the function of the knife valve is to ease the valve closure when the remaining aperture is minimal by permitting material flow (which may be a granular solid or a liquid or a combination thereof) to continue until the plate is seated in the gasket. In the case of a rectangular cross section aperture, the knife edge reaches the closure point uniformly across the width of the valve. While a circular opening may allow a more gradual closure, in each case solid debris may be guided towards the remaining opening while remaining lodged in the aperture, so that a substantial blockage may occur and full closure of the valve prevented.

An improved valve is desired so that debris may be accommodated by, for example severing that portion of the debris encountered by the blocking member as it operates to close the valve.

SUMMARY

A scissors-type gate valve assembly and system for water control is disclosed having a fixed plate with an aperture therethrough, and a sliding plate also having an aperture that aligns with the fixed plate aperture in an open position. The sliding plate covers the fixed plate aperture when the valve is in a closed position. A linear actuator is connected to the sliding plate to move the sliding plate between the open and closed positions. The rectangular aperture has a ratio of the long axis to the short axis of greater than or equal to about 3:1 The long axis of the aperture is inclined with respect to the vertical and the sharp edge of the aperture in the sliding plate makes an acute angle with respect to the long axis of the aperture in the fixed plate.

At least some of the edges of the apertures may be provided with a sharp edge or serrated edge, in order to sever any branches or other debris caught in the apertures as the sliding plate moves to the closed position.

BRIEF DESCRIPTION OF THE DRAWINGS

FIG. 1A is an elevation view of an example of the scissors valve as attached to an upstream face of a dam;

FIG. 1B is a cross section view of the scissors valve of FIG. 1A illustrating the placement of the scissors valve with respect to an aperture in the dam;

DETAILED DESCRIPTION

Figure 2:
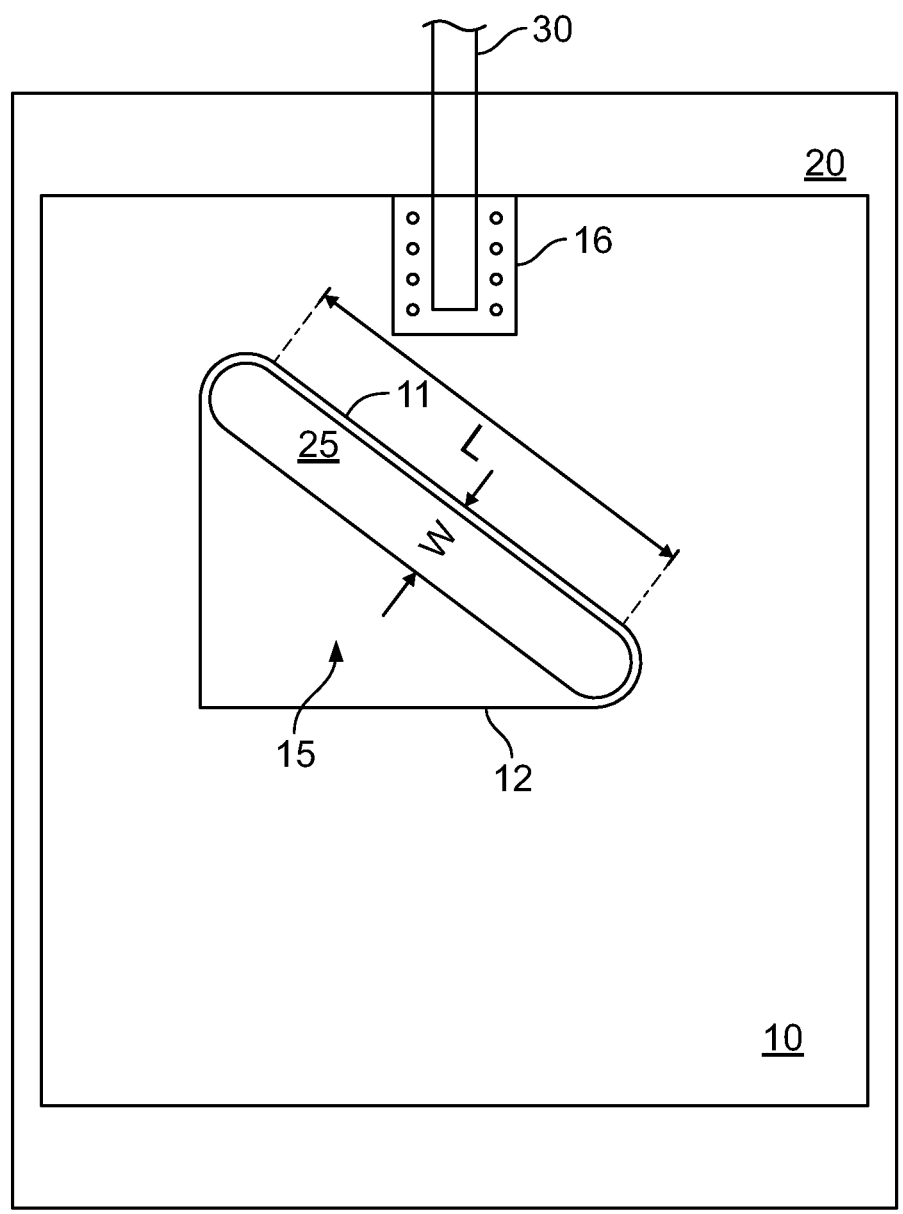
FIG. 2 is a more detailed view of the two plates of FIG. 1A, from an upstream direction and in an open position.

Exemplary embodiments may be better understood with reference to the drawings, but these embodiments are not intended to be of a limiting nature. Like numbered elements in the same or different drawings perform equivalent functions. When a specific feature, structure, or characteristic is described in connection with an embodiment, it will be understood that one skilled in the art may affect such feature, structure, or characteristic in connection with other embodiments, whether or not explicitly stated herein.

An example of a scissors-type gate valve assembly 1 is shown in FIG. 1A and FIG. 1B, adapted to be attached to an upstream surface of a dam 60 having an aperture 70 corresponding to at least the dimensions of the aperture 25 in the fixed plate 20. The exit interface of the aperture 70 may be closed by a blanking plate 105 (shown in FIG. 4), or the like to permit the installation and servicing of the valve when there is a water head above the valve opening. The aperture may be lined with metal or PVC, grouted in place, so as to mitigate the effects of water-flow erosion.

The fixed plate 20 is mounted to the face of the dam 60 using a frame 90 adapted to couple to the fixed plate and the facing surface of the dam. The coupling may be effected by bolts or other fasteners.

The frame 90 may extend above and below the aperture to a distance depending on the additional functions that may be performed, such as serving as a columnar support for the stem 30 and the source of motive power 100. Alternatively, such functions may be performed by individual elements mounted to the face or the top of the dam 60.

In this non-limiting example the scissors gate valve mechanism is configured to move a plate 10 in a vertical direction with respect to the fixed plate 20. Plate 10 is captivated by the frame 90 such that it may move vertically and the surface of movable plate 10 is in close proximity to the opposing surface of fixed plate 20 including being in contact with at least portions of the fixed plate 20 resulting from the stem 30 being translated in the vertical direction. As shown in FIG. 1, a symbolic "crank" at the top of the assembly acts on a threaded portion of the stem 30. Alternately, a geared electrical motor, pneumatic device, or the like may be used.

The two plates may be spaced apart by a low friction surface affixed to either or both of the plates so as to reduce and stabilize the force needed to overcome static and dynamic friction. In a dam application where the scissors valve is mounted to the upstream surface of the dam, the movable plate 10 is pressed against the fixed plate 20 by the head of water.

FIGS. 1 and 2 show the scissors valve in an "open" position so that the aperture 25 in the fixed plate 20 is exposed through an aperture 15 in the sliding plate 10. In this configuration water may freely flow through the aperture 25 in the valve and exit the dam through the aperture 70. Aperture 70 is simply shown as a rectangular aperture, however the aperture may be sized and dimensioned to minimize the area of the dam surface to be removed while minimizing the interference with the flow of the exiting water. The locations of the apertures 15 and 25 in the fixed plate 20 and the movable plate 10 may be interchanged.

Figure 3:
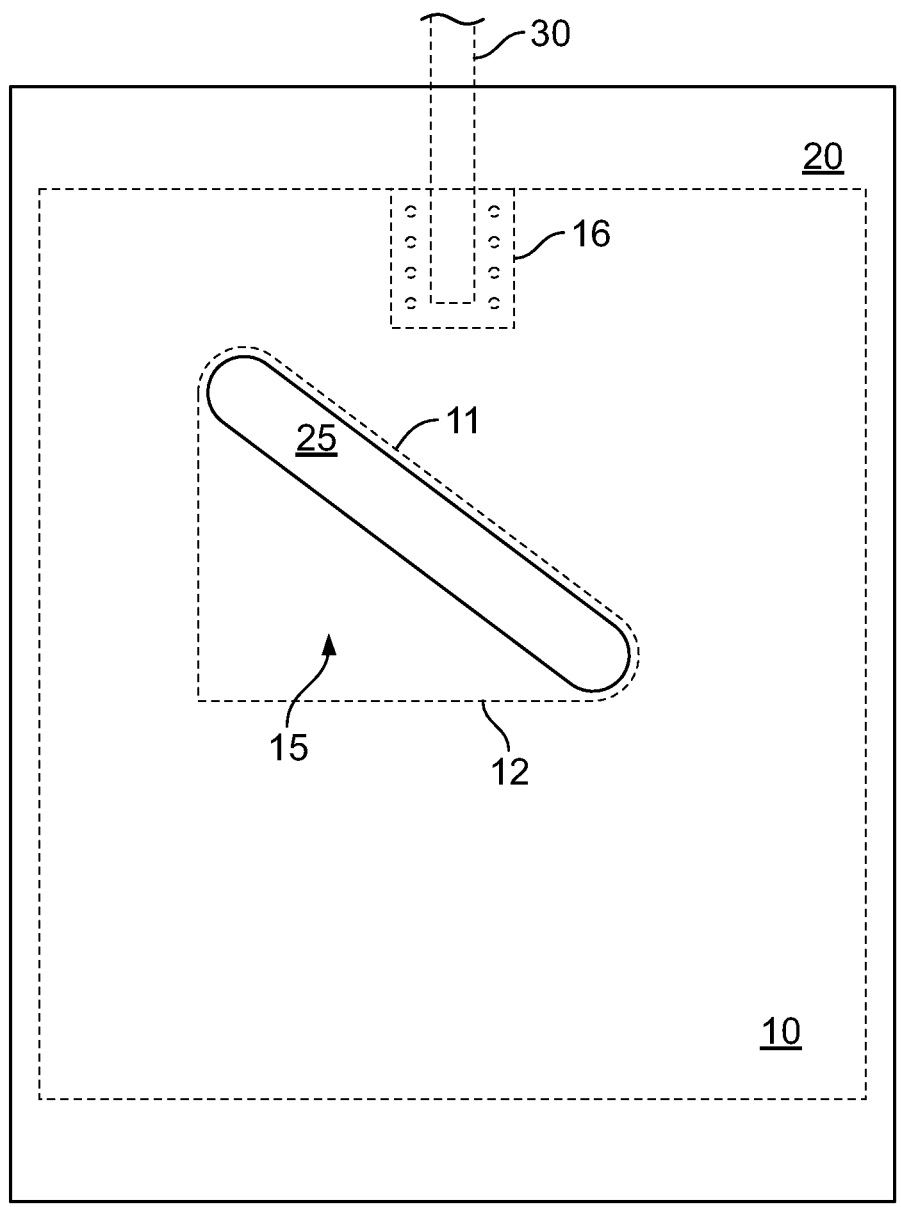
FIG. 3 is a more detailed view of the two plates of FIG. 1A, from a downstream direction and in an open position.
Figure 4:
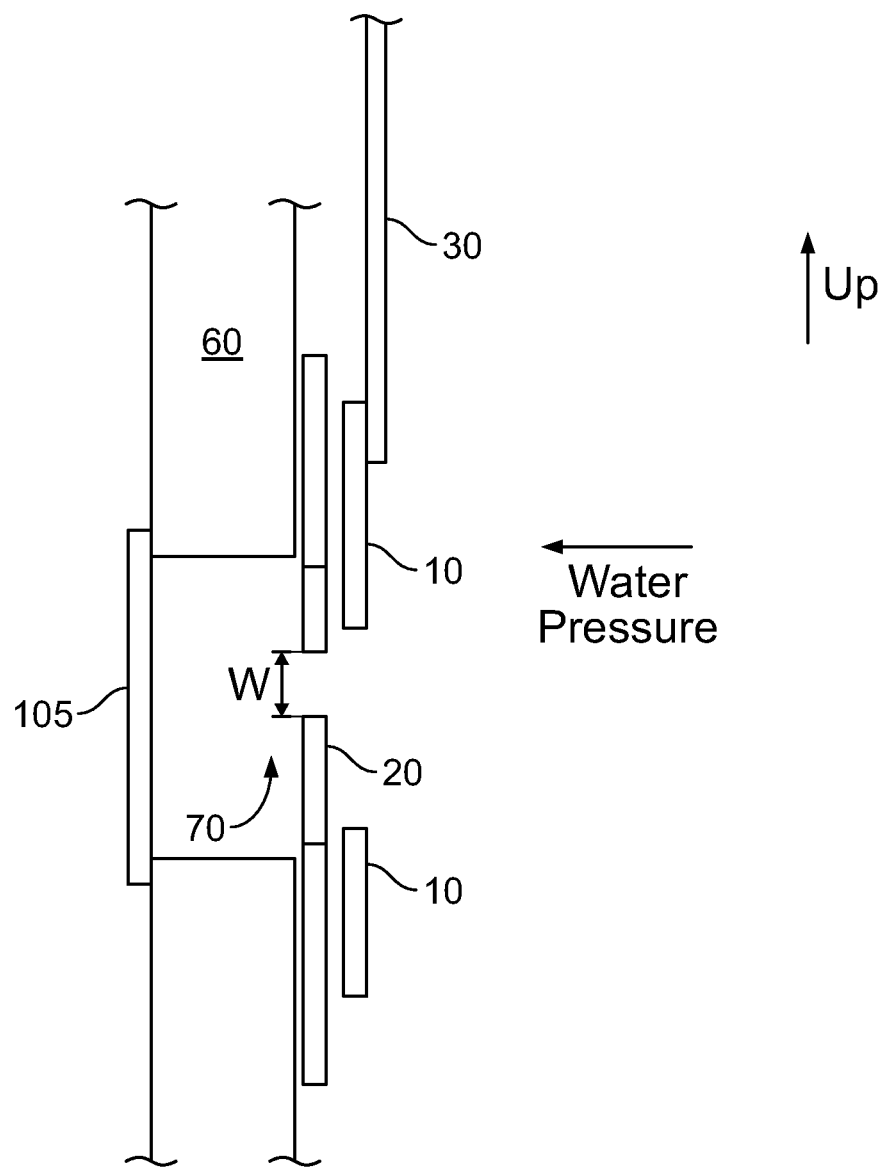
FIG. 4 is a more detailed view a portion of the of the scissors valve shown in FIG. 1B, where the separation between the two plates is exaggerated for clarity, and a blanking plate is on the downstream face of the dam so that the valve may be maintained while the reservoir has a water head.

The stem 30 urges the movable plate 10 vertically so as to move the relative position of the aperture 15 with respect to the fixed aperture 25, by the stem 30 attached to the movable plate by an adapter 16. The stem 30 may be of the rising or non-rising type depending on the specific design. Only one scissors valve assembly 1 is shown, however a number of scissors valves 1 may be installed on the dam face depending on the maximum flow rate desired and the capability of each valve. The valves may be actuated independently, increasing the overall redundancy of the installation. FIG. 2 is a plan view of the plate assemblies from the upstream perspective, where the frame 90 is not shown, for clarity. The gate valve is in an open position. The aperture 25 in the fixed plate 20 is sized depending on the water volume to be discharged and the number of gates in the dam. An example aperture 25 may have a width of 10 inches and a length of 40 inches and oriented at for, example, an angle of 45 degrees with respect to the vertical. Specific dimensions are provided in this example to assist in visualizing the apparatus, however it is not intended to limit the dimensions, angles or the like as they will be dependent, for example, on the flow rate in the open position, the head, and the type of debris expected. Moving plate 10 has an aperture 15 may be a triangular shape and the lower edge 12 may be configured to have a sharp edge facing the aperture 25. This edge may be integral to the plate or removably affixed thereto for maintenance purposes. FIG. 4 is the assembly of FIG. 3 as seen from the downstream perspective with the intervening dam structure not shown.

In the example shown, in operation, when the stem 30 is raised by the motor, the movable plate 10 rises with respect to the fixed plate 20 and the lower edge 12 of the aperture 15 begins to obstruct a portion of the aperture 25. As the fixed plate is further raised, the entirety of the aperture 15 is above the top of the aperture 25, thus closing the aperture and stopping the flow of water. When the valve is "closed", the upstream water pressure urges plate 10 against plate 20 so that leakage of water through the aperture 25 is minimized. The need for flexible sealing members, typical of gate valves may be minimized or eliminated, as slight leakage of water through the valve may be tolerated in many applications. However, it may be desirable to introduce a sealing structure operative when the gate is in a closed position.

Figure 5:
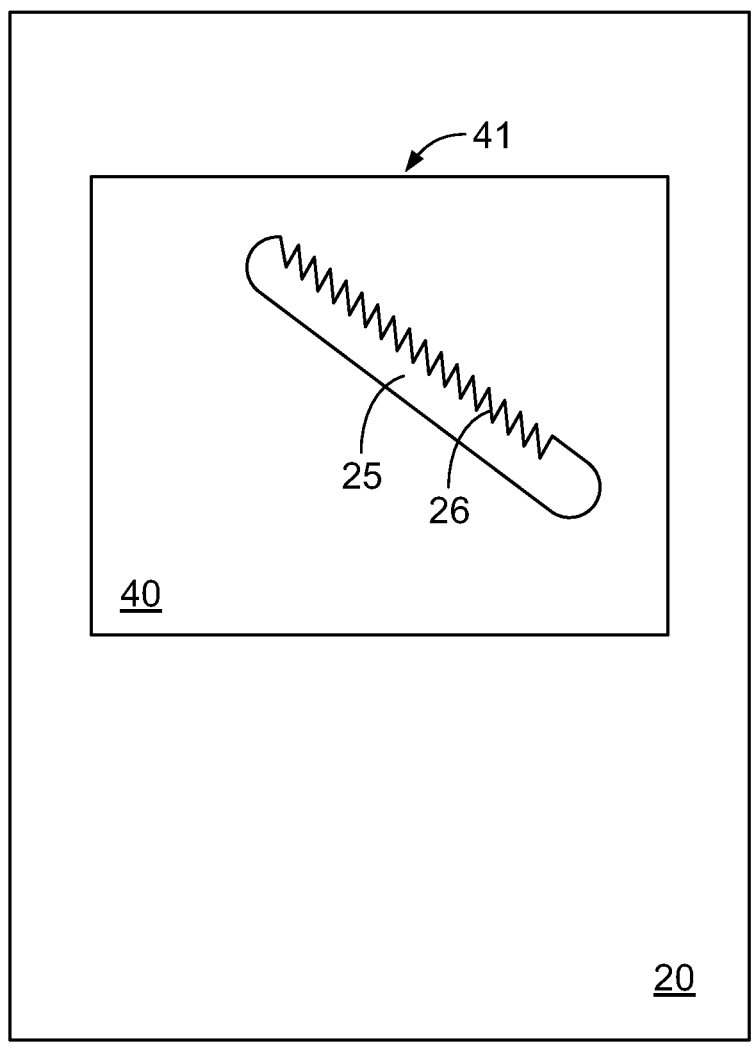
FIG. 5 is an example of the location of a low friction surface on at least one of the plate surfaces and a serrated edge on an edge of the aperture.

FIG. 4 is a profile view of a portion of the scissors gate valve 1, where the space between the fixed plate 20 and the sliding plate 10 is exaggerated for clarity. In practice, the two plates may be in sliding contact with each other, with the vertical edges thereof captured in the side members of the gate. Sliding surfaces on the faces of the two plates may be fitted with strips or areas of polymer material to reduce friction. An example of a sealing structure may be seen in FIG. 5 where an area 40 of the fixed plate may have an applied layer of low-friction plastic material. Engineered plastic sheets may provide a durable and low friction interface between the face of plate 20 and the face of plate 10. A composite layer material may also have a resilient core so that better conformance between the two plates can be achieved. The specific design details depend on the level of seal desired. The net force is determined by the area of the aperture 25, and may be further adjusted by providing a set-back of the low-friction material from the sides of the aperture. The force exerted on the moving plate 10 may be estimated as 63 lb/sq-ft per foot of head multiplied by the area of the aperture 25. Once the knife edge 12 of the sliding plate 10 has lifted such that it exceeds the height of the upper edge 41 of the seal 40, the leakage of water through the closed valve is minimized.

This type of valve may be advantageously used in situations where natural debris such as branches evade any upstream barriers and get stuck in the aperture 25 when it is in the open position. When the valve begins to close, (in this example, when the movable plate rises with respect to the fixed plate) the sharp edge 12 of the aperture 15 acts on a portion of the material that may be stuck in the aperture 25 and acts to sever the branch, or the like, so that the valve may close. This is an improvement on a conventional knife valve where the knife may to act on blockages anywhere in the entire aperture where more than one object may be encountered so that additional force may be needed.

Conventional gate valves are in a closed position where the movable plate seats in a gasketed receiving region on the periphery of the fixed member. Here, the motion of the movable plate 10 with respect to the fixed plate 20 continues until the solid portion of the movable plate 10 completely obscures the aperture 25. The motion may continue for some distance so as to better seal the valve by the use of a bushing strip (not shown) or by permitting the movable plate to come into closer proximity with the fixed plate. The quality of the seal between the plates may not completely block the flow of water, however such leakage may be acceptable in the context of the application. While conventional gaskets where the movable element seats in the gasket at the time of full closure may be used for water control or for grain or other small sized material, they are not intended for use where an unexpected obstruction is encountered.

In order to better captivate branches or limbs trapped in the aperture 25 due to the force of the knife edge 12 urging the branches upward along the sloping aperture 25, the upper edge of the aperture 25 may be fitted with a serrated edge 26 to captivate the obstruction against the sharp edge 12 while it is being severed. The number and size of the obstructions is somewhat unpredictable, but as the valve progressively closes, the knife edge 12 advances along the long axis of the aperture 25 and encounters the obstruction which becomes captivated between the knife edge 12 and an opposing edge of the aperture 25, so that the cutting force of the blade may be effectively employed. As a practical matter, the valve closing operation may be performed a plurality of times to ensure that all of the obstructions have been severed and that the valve may close completely. An overload sensor may also be used to avoid stalling of the actuator mechanism. A closure operation completed with an overload may be an indication that the operation has been successfully performed. Where a plurality of valves are actuated by a common source of motive force, the coupling of the stem to the movable plate may have either a spring or some overload release such that a jam preventing the closure of a single valve will not compromise the operation of the remaining valves.

Valves of this type may be installed in dams being constructed or retrofitted and be used to control the water level of a dam in accordance with a policy. This policy may sometime result in low water heads and a concentration of debris near the valve. The number and size of valves needed will be dependent on the specific application.

The scissors valve may be configured to slide horizontally or vertically. Both the knife edge 12 and the slot 25 may be disposed at an angle with respect to the vertical. The general configuration of the two plates is that the knife edge and an opposing edge of the other aperture are disposed at an acute angle with respect to each other. Also, the fixed aperture may have an aspect ratio of about 3:1 or greater so as to position the obstruction(s) such that individual obstructions may be encountered successively as the valve closes, so as to minimize the total force to be applied through the stem.

In another aspect, the long axis of the aperture may be horizontal and the knife edge may be positioned so as to make an acute angle with the long axis. Depending on the nature of the obstructions expected, and the aperture dimensions, the acute angle may range from about 10 degrees to about 70 degrees, and a typical angle may be 30 degrees.

Although the knife 12 is described as part of the movable plate, a knife edge may be provided on the opposing edge of the fixed plate. The knife edges may be separate pieces that are bolted or otherwise fastened to the plates so as to facilitate maintenance.

The fixed and movable plates may be spaced apart, for example, by rollers or leaf springs disposed along the captivated sides. The valve components may be fabricated from engineering materials having suitable physical properties and may include stainless steel, titanium or the like.

Although only a few exemplary embodiments of this invention have been described in detail above, those skilled in the art will readily appreciate that many modifications are possible in the exemplary embodiments without materially departing from the novel teachings and advantages of the invention. Accordingly, all such modifications are intended to be included within the scope of this invention as defined in the following claims.

What is claimed is:

1. An apparatus configured for mounting on an upstream face of a dam facing an aperture therein, comprising:
   a first plate having a first aperture;
   a second plate with a second aperture is configured to be fixedly attached to face of the dam, wherein the first plate and the second plate are slidably captivated;
   a linear actuator configured to slidably move the first plate with respect to the second plate; and
   at least one of the first aperture or the second aperture having a sharp edge disposed opposing an edge of the other one of the apertures such that an acute angle is formed between the sharp edge and the edge of the other aperture,
   wherein the aperture in the second plate is disposed to permit water flow through the aperture in the dam; and the first aperture is sized and dimensioned to coincide with at least a portion of the second aperture, when the apparatus is in an open state, and to obstruct the second aperture when the apparatus is in a closed state.

2. The apparatus of claim 1, wherein the first plate of the apparatus is urged by the linear actuator to transition from the open state to the closed state, such that a dimension of the aperture defined by an overlap of the first aperture and the second aperture narrows progressively in a direction along a bisector of the acute angle.

3. The apparatus of claim 2, wherein the linear actuator is urged by a motor to slide the first plate.

4. The apparatus of claim 1, wherein the acute angle is between about 10 degrees and about 70 degrees.

5. The apparatus of claim 4, wherein the acute angle is about 30 degrees.

6. The apparatus of claim 2, further comprising:
   a low-friction plastic surface affixed to an opposing surface of at least one of the first plate or the second plate.

7. The apparatus of claim 2, wherein the edge of the other aperture is serrated.

8. The apparatus of claim 2, further comprising a structural plate having dimensions larger than the aperture in the dam, adapted to be removably attachable to a downstream face of the dam.

\* \* \* \* \*